United States Patent [19]

Cayless et al.

[11] Patent Number: 5,013,381

[45] Date of Patent: May 7, 1991

[54] PROCESS FOR THE TREATMENT OF A METAL OXIDE LAYER, A PROCESS FOR BONDING A METAL OBJECT COMPRISING A METAL OXIDE LAYER AND STRUCTURES PRODUCED THEREFROM

[75] Inventors: Richard A. Cayless, Maidenhead; Leonard B. Hazell, Burpham, both of England

[73] Assignee: The British Petroleum Company p.l.c., London, England

[21] Appl. No.: 305,831

[22] Filed: Feb. 2, 1989

[30] Foreign Application Priority Data

Feb. 3, 1988 [GB] United Kingdom ............... 8802375
Feb. 25, 1988 [GB] United Kingdom ............... 8804392

[51] Int. Cl.$^5$ ............................................. B32B 31/00
[52] U.S. Cl. ..................................... 156/281; 156/319; 427/343; 428/469; 428/629
[58] Field of Search ............... 156/281, 319; 428/469, 428/629; 427/343

[56] References Cited

U.S. PATENT DOCUMENTS 2,913,813  11/1959  Homer et al. ...................... 428/629
3,592,681  7/1971  Hatwell et al. .
4,474,607  10/1984  Gordie et al. .
4,749,550  6/1988  Gordie et al. .

FOREIGN PATENT DOCUMENTS 89810    9/1983  European Pat. Off. .
193398   3/1986  European Pat. Off. .
3423990  1/1985  Fed. Rep. of Germany .
1398047  6/1975  United Kingdom .
214477   3/1985  United Kingdom .

*Primary Examiner*—John J. Gallagher
*Attorney, Agent, or Firm*—Larry W. Evans; Joseph G. Curatolo; Teresan W. Gilbert

[57] ABSTRACT

The naturally occurring metal oxide layer in contact with a metal in the bulk state is treated with a solution of a salt of yttrium or the lanthanide metals. The treatment is applied in order to increase the adhesive strength of bonds between the metal and subsequently applied adhesives and to enhance the durability of such bonds in aqueous environments. The concentration of the applied solution is preferably in the range $10^{-2}$ to $10^{-6}$M. Yttrium or samarium nitrate is the preferred salt. The treatment is preferably used in conjunction with epoxy resin adhesives.

7 Claims, No Drawings

PROCESS FOR THE TREATMENT OF A METAL OXIDE LAYER, A PROCESS FOR BONDING A METAL OBJECT COMPRISING A METAL OXIDE LAYER AND STRUCTURES PRODUCED THEREFROM

This invention relates to the surface treatment of metals.

Various treatments of metal surfaces using metal salts or complexes are known.

Rare earth metal salts have been used in the treatment of conversion coated metal surfaces (Patent GB 1398047).

A conversion-coating is a coating applied to a clean metal surface by means of a chemical pretreatment prior to painting for the purposes of increasing corrosion resistance and humidity resistance of the final painted surface. The conversion coating usually comprises an oxyanion such as phosphate, chromate, oxalate or arsenate. Conversion coatings in nearly all cases are greater than 0.1 micrometers thick, and will typically be approximately 1 micrometer thick.

GB 1398047 discloses the use of aqueous acidic solutions of rare earth metal salts in the rinse step of a metal treatment process. The process disclosed in GB 1398047 also involves a conversion coating step.

It is desirable to treat metal surfaces to improve the bond strength between the metal surface and a subsequently applied adhesive without having previously applied a conversion coating to said surface.

We have now found that solutions of the rare earth metal salts can be used to treat metal surfaces to improve adhesion promotion.

References to metal surfaces will necessarily be references to metal oxide surfaces since a metal surface exposed to the air has a naturally occurring oxide layer. This naturally occurring oxide layer is formed by oxidation of the surface metal atoms and all common metals except gold are found to possess such a layer. Such metals include iron, steel, aluminium, zinc and copper. Only under extreme conditions (e.g. high vacuum, inert gas atmosphere) can an oxide layer be absent from a metal surface. In all common working environments, the oxide layer will be present, but its thickness will vary according to the metal and the conditions it is subjected to. Typically the oxide layer on steel at ambient conditions will have an average thickness in the range 2-20 nm.

According to the present invention there is provided a process for the treatment of a metal oxide layer, the metal oxide layer being in contact with a metal in the bulk state and being formed by exposure to oxygen of the metal in the bulk state characterised in that the metal oxide layer is treated with an aqueous solution of a salt of a metal selected from the group consisting of yttrium and metals of the lanthanum series having atomic numbers from 57 to 71 inclusive for a continuous period of less than 1 day, the metal oxide layer being subsequently subjected to a drying process.

According to a further aspect of the present invention there is provided a process for bonding a metal object to a second object, the metal object comprising a surface metal oxide layer which is formed by exposure to oxygen of the metal object, comprising contacting at least a part of the surface metal oxide layer with an adhesive and bringing the second object into contact with the adhesive characterised in that the part of the surface metal oxide layer in contact with the adhesive has been treated with an aqueous solution of a salt of a metal selected from the group consisting of yttrium and metals of the lanthanum series having atomic numbers from 57 to 71 inclusive.

According to a further aspect of the present invention there is provided a structure comprising a metal object bonded to a second object by means of an intervening layer of adhesive, the metal object having a surface metal oxide layer which is in contact with the adhesive characterised in that the surface metal oxide layer in contact with the adhesive has been treated with an aqueous solution of a salt of a metal selected from the group consisting of yttrium and metals of the lanthanum series having atomic numbers from 57 to 71 inclusive.

The present invention involves the application of an aqueous solution of a salt of yttrium or of a lanthanide metal to a metal surface. For the purposes of the present invention a metal surface will not have been subjected to a conversion coating. However, the metal surface will have associated with it a naturally occurring metal oxide layer. The metal surfaces in the present invention may have undergone an initial cleaning step, for the purposes, for example, of removing temporary protective materials such as oil. This cleaning step may be by chemical means (alkaline wash) or mechanical means (abrading); such methods are well known in the art.

The present invention is applicable to all metals having a surface oxide layer, in particular steel, aluminium and zinc, preferably steel, more preferably cold rolled mild steel. The surface oxide layer will be supported on metal in the bulk state, by which is meant metal where the metal atoms are bonded to one another as opposed to being bonded to oxygen atoms as in the metal oxide. The usual interpretation of the term "metal" is metal in the bulk state. For the purposes of the present invention, a metal object will comprises a metal oxide layer being in contact with metal in the bulk state.

The present invention is carried out using an aqueous solution of a salt of a metal selected from the group consisting of yttrium and the lanthanum metals having atomic numbers from 57 to 71, preferably a salt of yttrium or samarium. The solutions referred to can either be solutions of salts of individual metals or they can be solutions of mixed metal salts. Mixed metal salts may be derived from natural ores where the occurrence of several metals is known. The counter anion is preferably the nitrate anion.

The concentration of the applied solution is preferably in the range $10^{-2}-10^{-6}M$, more preferably in the range $10^{-3}-10^{-5}M$, still more preferably in the range $5.0\times10^{-3}-5.0\times10^{-4}M$.

The contact time can also be important for obtaining optimum results. If the contact time is too long, then a thick layer of the metal salt will be deposited on top of the oxide layer. This would effectively weaken the adhesive/metal surface interface. If the contact time is too short then there would be incomplete coverage by the metal salts, thus diluting the beneficial effects. The contact time at ambient temperature for a solution concentration of $10^{-2}-10^{-3}M$ should normally be 10s-10 mins, preferably in the range 1-8 mins, more preferably in the range 3-7 mins.

The thickness of the rare earth metal treated oxide layer is of importance for the reasons given above. The thickness of the treated oxide layer will preferably be in the range 2-20 nm, more preferably in the range 4-10 nm.

The treatment of metal surfaces with rare earth metal salts is suitably used in conjunction with adhesives, preferably polymeric adhesives. Examples of such adhesives are epoxy resins, acrylic resins, polyurethane resins, vinyl resins, and phenolic resins, preferably epoxy resins.

It is envisaged that the invention is used to increases adhesive bond strengths and to enhance the durability of adhesive bonds particularly in aqueous environments. A typical structure using the present invention would comprise two pieces of metal treated according to the invention, and bonded together using an adhesive, the adhesive contacting the rare earth metal salt treated metal surfaces. The adhesion of a surface coating to a metal surface can also be enhanced by treatment of the metal surface according to the present invention. It is preferred to apply the adhesive or surface coating to a dry surface; it is therefore preferred to follow the treatment with the aqueous salt solution with a drying step.

The invention is now illustrated with reference to the following Examples.

Adhesion Test Method

Mild steel test pieces (pretreated as described below in Examples A, B and 1-9) were bonded with epoxy adhesive to determine the adhesive properties of treated and untreated steel. The test pieces measured 25.4 by 63.5 mm and were cut from 0.75 m steel paint test panels supplied by the Pyrene Chemical Services Ltd. This is grade CR1 cold rolled steel polished on one side only and supplied coated with a protective oil to prevent rusting. The adhesive was a simple commercially available epoxy resin; Shell Epikote 828 cured with DMP30 hardener (Anchor Chemical Company). 10 parts adhesive were mixed with one part of hardener (by weight) immediately prior to use. The steel was cleaned in an ultrasonic solvent decreasing bath (1,1,1-trichloroethylene) to remove the protective oil prior to any treatment 25.4 mm square lap bonds were prepared by bonding the ends of the polished sides of two test pieces together with a 25.4 mm overlap. Bond line thickness was approximately 1 mm. The adhesive was then cured at 80 degrees centigrade for 1 hour.

A total of 8 such samples were prepared for each pretreatment. Of these, four were subjected to a durability test (400 hours immersion in distilled water at 50 degrees centigrade) to determine the effect of hot wet environments on joint strength. The bond strengths of the joints were determined using an Instron materials testing machine in which samples are pulled apart at constant speed and the load required to cause failure is recorded. The bonded samples are 101.6 mm long (2×63.5-25.4 mm overlap), of this 12.7 mm at each end is used by the test machine grips to hold the sample. The samples were pulled at 0.5 mm/minute under ambient conditions. The durability (water immersion) samples were tested immediately after removal from the water. The remaining four samples were tested in a similar fashion, but without having been subjected to the durability test.

The bond strengths of the joints are recorded as average failure strengths in Table I. Where the samples have undergone the durability test, the results are designated "400 h strength", where no such test took place, the results are designated "Initial Strength". The percentage loss of adhesion on undergoing the durability test is also given.

Test pieces were treated according to the invention as indicated below; these pieces were then tested according to the above adhesion test method. Results are given in Table I.

Treatment with yttrium nitrate

EXAMPLE 1 (according to the invention)

Test pieces were immersed in a $10^{-4}$ molar solution of yttrium nitrate in distilled water for 5 minutes, they were then rinsed twice using distilled water and dried on a tissue. The test pieces were then tested according to the adhesion test method described above.

EXAMPLES 2 and 3 (according to the invention)

Examples 2 and 3 were carried out according to the method described in Example 1 except that the yttrium nitrate solution had a concentration of $10^{-2}$ molar and $10^{-6}$ molar respectively.

EXAMPLES 4-6 (according to the invention)

Examples 4 to 6 were carried out according to the method described in Example 1 except that the test pieces were immersed in the yttrium nitrate solution for a period of 1 hour, and the yttrium nitrate solution had a concentration of $10^{-2}$ molar, $10^{-4}$ molar and $10^{-6}$ molar respectively.

Treatment with Samarium Nitrate

EXAMPLES 7 and 8 (according to the invention)

Examples 7 and 8 were carried out according to the method described in Examples 4 and 5 except that samarium nitrate solution was used instead of yttrium nitrate solution.

Pure compounds such as yttrium nitrate are relatively costly. Commercially available mixtures of rare earth nitrates which are much cheaper can also be used in treating test pieces (see Example 9).

Treatment with mixed rare earth nitrates

EXAMPLE 9 (according to the invention)

Example 9 was carried out according to the method described in Example 1 but using commercially available mixed rare earth metal nitrates.

Comparative Example A (not according to the invention)

Test pieces were tested according to the adhesion test method described above, the test pieces receiving no pretreatment other than described in the method.

Comparative Example B (not according to the invention)

Test pieces were immersed in distilled water for 5 minutes, dried then tested according to the adhesion test method described above.

TABLE I

| Example | Salt Used | Salt Solution Conc. (molar) | Immersion Time (mins) | Initial Strength (KN) | 400 h Strength (KN) | % Loss |
|---|---|---|---|---|---|---|
| A | — | — | — | 3.33 | 2.43 | 26.0 |
| B | — | — | 5 | 3.60 | 2.30 | 36.0 |
| 1 | $Y(NO_3)_3$ | $10^{-4}$ | 5 | 3.39 | 2.86 | 16.0 |
| 2 | " | $10^{-2}$ | 5 | 3.31 | 2.89 | 12.7 |
| 3 | " | $10^{-6}$ | 5 | 3.19 | 2.60 | 18.5 |
| 4 | " | $10^{-2}$ | 60 | 3.62 | 2.00 | 45.0 |
| 5 | " | $10^{-4}$ | 60 | 3.68 | 3.13 | 14.7 |
| 6 | " | $10^{-6}$ | 60 | 3.67 | 3.14 | 14.4 |
| 7 | $Sm(NO_3)_3$ | $10^{-2}$ | 60 | 3.68 | 3.09 | 16.0 |
| 8 | " | $10^{-4}$ | 60 | 3.65 | 3.23 | 11.5 |
| 9 | Mixed Rare Earth Nitrates | $10^{-4}$ | 5 | 3.53 | 3.04 | 14.0 |

The yttrium nitrate was supplied by BDH. The samarium nitrate was supplied by Johnson Matthey. The rare earth metal nitrate was supplied by Rare Earth Products (Widnes, Cheshire) as a solution of the metal oxides neutralised with nitric acid and subsequently diluted as needed.

We claim:

1. A process for bonding a metal object to a second object, the metal object comprising a surface metal oxide layer which is formed by exposure to oxygen of the metal object, comprising contacting a part of the surface metal oxide layer with an adhesive and bringing the second object into contact with the adhesive characterised in that the part of the surface metal oxide layer in contact with the adhesive has been treated with an aqueous solution of a salt of a metal selected from the group consisting of yttrium and metals of the lanthanum series having atomic numbers from 57 to 71 inclusive.

2. A process as claimed in claim 1 wherein the metal selected from the group consisting of yttrium and metals of the lanthanum series having atomic numbers from 57 to 71 inclusive is either yttrium or samarium.

3. A process as claimed in claim 1 wherein the aqueous solution of the salt of a metal selected from the group consisting of yttrium and metals of the lanthanum series having atomic numbers from 57 to 71 inclusive has a concentration within the range $10^{-2}$ molar to $10^{-6}$ molar.

4. A process as is claimed in claim 1 wherein said metal is in the bulk state and is selected from the group consisting of steel, aluminum or zinc.

5. A process as is claimed in claim 3 wherein the concentration is within the range of $10^{-3}$ molar to $10^{-5}$ molar.

6. A process as is claimed in claim 4 wherein said metal is in the bulk state and is steel.

7. A process as claimed in claim 1 wherein said adhesive is an epoxy resin.

* * * * *